US010275498B2

(12) United States Patent
Rutenberg et al.

(10) Patent No.: US 10,275,498 B2
(45) Date of Patent: Apr. 30, 2019

(54) METHOD AND APPARATUS FOR RANKING AND DYNAMICALLY DISPLAYING INFORMATION

(71) Applicants: Avrohom C. Rutenberg, Beit Shemesh (IL); Avorhom Shlomo Dickman, Bet Shemesh (IL)

(72) Inventors: Avrohom C. Rutenberg, Beit Shemesh (IL); Avorhom Shlomo Dickman, Bet Shemesh (IL)

(73) Assignee: Avrohom C. Rutenberg, Beit Shemesh (IL)

( * ) Notice: Subject to any disclaimer, the term of this patent is extended or adjusted under 35 U.S.C. 154(b) by 305 days.

(21) Appl. No.: 15/073,479

(22) Filed: Mar. 17, 2016

(65) Prior Publication Data

US 2016/0275138 A1 Sep. 22, 2016

Related U.S. Application Data

(60) Provisional application No. 62/134,472, filed on Mar. 17, 2015.

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
USPC ........................................................ 707/748
See application file for complete search history.

(56) References Cited

U.S. PATENT DOCUMENTS

| | | | | |
|---|---|---|---|---|
| 8,935,750 | B2* | 1/2015 | Golovanov | G06F 21/56 380/30 |
| 2003/0217121 | A1* | 11/2003 | Willis | G06F 17/30867 709/219 |
| 2004/0003096 | A1* | 1/2004 | Willis | G06F 17/30702 709/228 |
| 2004/0003097 | A1* | 1/2004 | Willis | G06F 17/30867 709/228 |
| 2007/0203816 | A1* | 8/2007 | Costache | G06Q 40/00 705/35 |
| 2007/0233513 | A1* | 10/2007 | Lapstun | G06F 3/03545 705/1.1 |
| 2007/0239701 | A1* | 10/2007 | Blackman | G06F 17/30864 |
| 2009/0157490 | A1* | 6/2009 | Lawyer | G06Q 10/063 705/59 |
| 2011/0010315 | A1* | 1/2011 | Paas | G06Q 30/02 706/11 |
| 2013/0073972 | A1* | 3/2013 | Yung | G06Q 50/01 715/738 |
| 2016/0042397 | A1* | 2/2016 | Okuno | G06Q 30/02 705/14.6 |

* cited by examiner

*Primary Examiner* — Cheyne D Ly
(74) *Attorney, Agent, or Firm* — Amster, Rothstein & Ebenstein LLP

(57) ABSTRACT

A dynamic webpage that displays data in groupings. The groupings are determined by users who score the data as representative of a specific category. The system dynamically rearranges the data and re-renders the webpage in response to receiving different scores for data previously scored.

3 Claims, 6 Drawing Sheets

METHOD AND APPARATUS FOR RANKING AND DYNAMICALLY DISPLAYING INFORMATION

RELATED APPLICATIONS

This Application claims the benefit of U.S. Prov. Appl. Ser. No. 62/134,472, filed Mar. 17, 2015—the contents of which are incorporated by reference herein.

FIELD OF THE INVENTION

The present invention relates to ranking and aggregating data, more specifically to a dynamic webpage displaying data, whereby the webpage rendering may be changed, substantially in real time, by users.

BACKGROUND OF THE INVENTION

News stories, data reports or such similar authored content are frequently presented in the guise of factual reporting when, in fact, there is an underlying bias or slant in the presentation. There is a need for systems, methods, and program products that can determine biases in information presentations. There is a further need for electronic displays of such information that indicate the identified biases.

The invention set forth herein seeks to provide solutions to these problems via systems, methods, and program products that can measure and/or aggregate user-identified bias in an information presentation and can further provide electronic displays of information which graphical user interfaces adapt based upon the identified biases.

SUMMARY OF THE INVENTION

The invention is a general communication mechanism and information processing system that allows for a large amount of opinionated or factual content (or any media) to be ranked, organized and/or categorized based on the interpretations of the information-consumer rather than the information generators. The invention provides a novel dynamic webpage that can display content based on real time feedback and rankings by users.

One object of the invention is to reframe the common values, facts, policies or events based on how the values are shared or contrasted by a large audience rather than by the few content generators. The goal is to empower people to make and share their own impressions and interpretations, ultimately resulting in a greater freedom of expression and a more accurate depiction of contemporary and evolving trends of shared values. The present invention provides a technological platform that can receive electronic bias values from end users for respective media works (e.g., news or other factual stories), process such values to generate a bias score, and/or provide dynamic webpage displays that adapt (e.g., in content and/or layout) based at least in party upon the computed bias score. In embodiments, the bias score may change in real time or near real time as additional bias values are received from end users and/or as previously provided bias values are modified by users. In embodiments, the webpage display may adjust when bias scores change by predefined threshold amounts (e.g., percentages) and/or when respective bias scores for a plurality of media works change in relation to each other by predefined threshold amounts (e.g., a first bias score for a first media work exceeding a second bias score for a second media work by a simple majority score or the first bias score exceeding the second bias score by a fixed amount or a percentage amount).

The system software is designed to manipulate and/or store and/or display content with the incorporation of run/time or previously defined (including learned approaches) criteria based on users and/or grouping of users and/or a user/grouping selected biased-user(s) prior designation and/or the biased-user(s) selected and/or customized algorithm or use of key words. The software also is configured to perform retention and/or display and/or dynamic and/or static dissemination of aggregated and/or selected groupings media/content or other communicable information.

BRIEF DESCRIPTION OF THE DRAWINGS

The above and related objects, features and advantages of the present invention will be more fully understood by reference to the following, detailed description of the preferred, albeit illustrative, embodiments of the present invention when taken in conjunction with the accompanying figures, wherein.

DETAILED DESCRIPTION OF THE INVENTION

Figure 1:
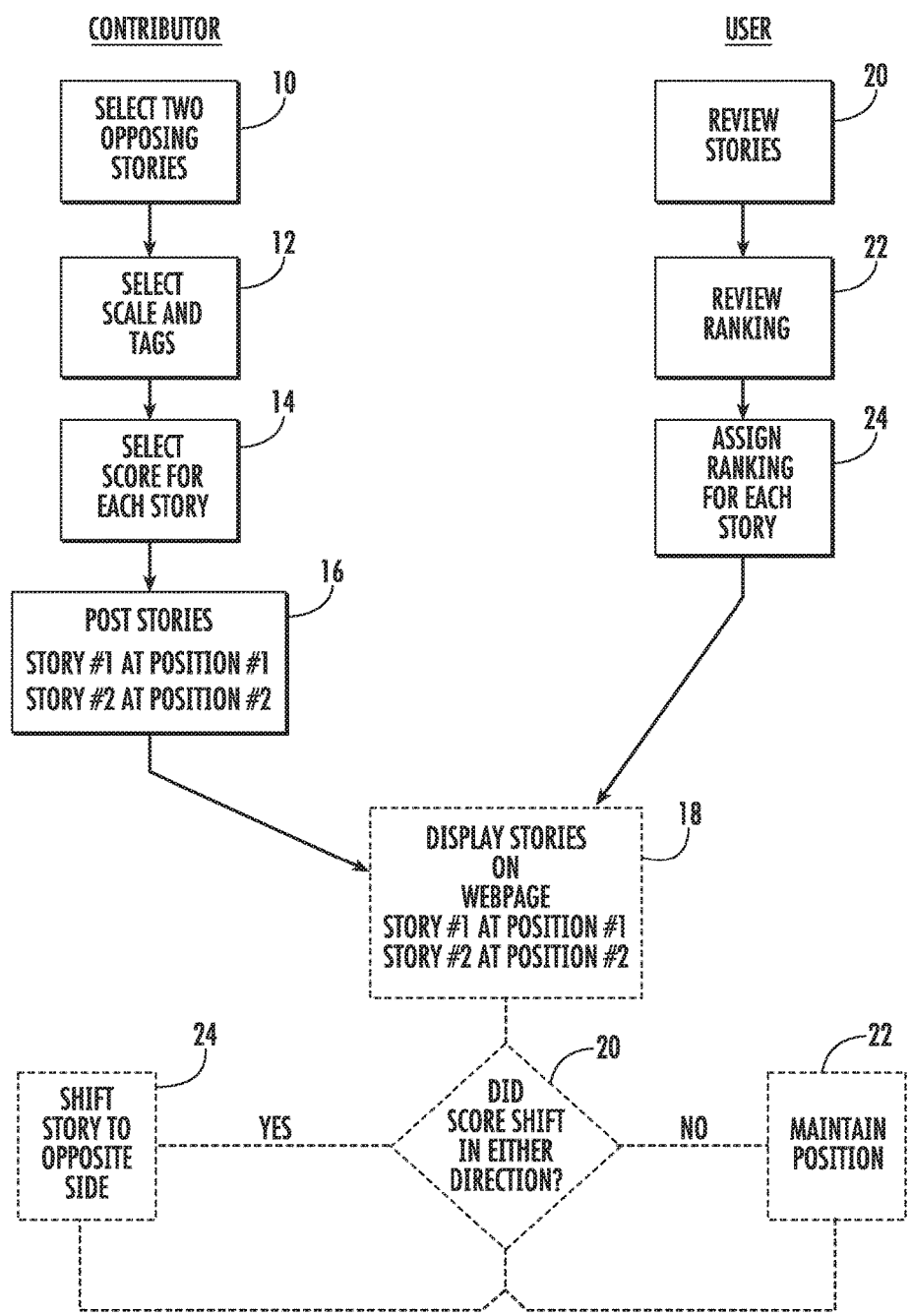
FIG. 1 is a flow chart showing a system architecture according to an exemplary embodiment of the invention.

The inventive system includes specialized software to run the various tasks and operations described herein running on one more computers or servers. The system components include a user interface (or other means) that provides a user with one or more content presentations and a graphical user interface whereby information as pertaining to a specific grouping(s) (e.g. current, historical and or based off of key words/phrases) is selectable by a user. The system also has a back end retention or dynamic generation tool and a user interface or other means of retaining and disseminating including dynamically driven display or other information sharing means. User designations are stored on a digital storage device and displayed to other users of the system.

The system, thus, allows users (internal or external) to specify what content they choose as significant (or insignificant) and to designate, content and/or concept and/or approach as coming from a specific perspective according to their own approach or grouping(s) of ideas, or contrary to one's opinion(s) or part of a contrasting grouping(s). Alternatively, a user may designate content as balanced. One important aspect of the invention is providing users with the ability to specify that existing or conceptual ideas are important or grouped as per above. This designation would then be retained and/or aggregated based on a specific users designation (such as the ability to view or have the approach based on (and/or biased) from an individual, group and/or preset list of key words or aggregated approach.

The resultant information is then displayed and/or retained in a raw or aggregated format which can be manipulated and/or searched and/or filtered based on users preference(s), existing algorithms, custom filtering such as key worlds and/or the designation of others specific and/or general aggregated or specified bias(es)/grouping(s).

In embodiments of the invention, a dynamic display is rendered which changes, substantially, in real time based on contributor or user inputs—or a combination thereof.

In embodiments of the invention, the system allows a contributor to select two stories, each representing a contrasting view or slant. The contributor then publishes the stories which are positioned on a display in a side-by-side orientation. The position of each story is determined by a value that a contributor assigned to each story from a score line or scale.

It will be understood that the invention relates to a dynamic webpage that displays data. In embodiments of the invention, data may be articles, news stories, opinions, scientific papers, scientific data or such similar information available on the internet. In exemplary embodiment, the displayed data are news stories and the terms "story," "stories," "article," or "articles" herein shall include any digital data available on the internet. It will be understood that although embodiments of the invention are described with respect to webpages, the invention relates to any of various interface presentations, such as mobile applications and the like.

In embodiments of the invention a select group of users will have access to a backend area of a website which hosts a dynamic webpage (e.g. via an application layer interface) and will have the necessary permissions to upload content thereto. Such users will be respectively referred to as "contributors." The website hosting the dynamic webpage will be accessible to end users thought the world wide web. Such end users may be referred to as "users," "viewers" or "readers" herein. The term Embodiments of the invention are implemented within a web-based system architecture. The software used to run the processes and routines described herein may be housed in one or more servers. It will be understood that a server shall refer to a computer or workstation having at least one processor, system memory, disk or other permanent storage, an operating system, and one or more application programming interfaces (API). The term "system" herein shall include the hardware and software application programmed to execute the function and routines described herein.

As a non-limiting example, server may be a Dell PowerEdge R530 running the Windows Server 2012 R2 operating system and a server program such as IIS, to host the web portions of the Social Libra system, as well as program such as Windows Task Scheduler or similar scheduling program to run the supporting jobs and tasks.

As a non limiting example, a client or user device is a personal computer or mobile device.

FIG. 1 shows a flow chart illustrating an exemplary platform for constructing a novel dynamic data display. The steps executed by contributors and users are shown in solid line, whereas, the steps executed by the system are shown in dashed lines. In embodiments of the invention, in an initial step (10), a contributor selects two different articles from among articles found on the Internet, whereby the two stories are believed by the contributor to represent contrasting views, slants, information, or stances. The contributor copies URLs for each of the stories and inserts them into appropriate fields on the system.

The contributor then selects a ranking scale (step 12) for each story. The scale is reflective of a of point of contrast between the two stories. For example, in the event that a first selected story is believed to lean pro Democrat, whereas, a second story is believed to be pro Republican, the contributor will select a "Democrat/Republican" scale and assign the scale to each story.

In one embodiment, the system will provide a contributor with standard scales to select and assign to stories, for example, via a menu on a contributor page. In other embodiments of the invention, a contributor may create a custom scale and assign the custom scales to respective stories. Still in other embodiments of the invention, the system utilizes an algorithm to render a scale based on keyword and/or tags within the story.

In embodiments of the invention, a scale comprises a spectrum of values (e.g. from 1-100). Values 1-50 represent a first position, whereas values 51-100 represent a second position. In embodiments, contributors and users may assign a score at any point along the scale (i.e. they may assign any number between 1-50 within a first position and any number between 51-100 for a second position). For example, in a "Democrat/Republican" scale, values 1-50 may represent "Democrat," whereas, values 51-100 represent "Republican." Moreover, values descending from 50 to 1 reflect a direction of increasing extremism toward a perspective, and values ascending from 51-100 reflect a direction of increasing extremism toward a perspective. That is, a value of approaching zero represent the most extreme Democrat side and values approaching 100 represent the most extreme on the Republican side. Values approaching the midpoint (e.g. 50) on each side indicate a direction of convergence.

Still in other embodiments of the invention, a values at a first end of a spectrum (e.g. 1-40) represent a first perspective, values on a second end of a spectrum (e.g. 60-100) represent a second perspective and values in a mid range of a spectrum (e.g. 41-59) may represent a neutral view.

In embodiments of the invention, contributors/users may select any value on a scale of 1-100. For example, a story deemed to be highly Democratic may be given a score of 1, whereas a story deemed to be moderately on the Republican side may be given a score of 60.

In embodiments of the invention, the scale is a continuum of values representing discrete locations along a spectrum. For example, in a "Democrat/Republican" scale, there may be values representing "extremely Democtractic," "moderately Democtratic," "somewhat Democratic," "extremely Republican," "moderately Republican," and "somewhat Republican."

In an embodiment of the invention, a contributor selects two stories where one is in the Democrat camp and the second is in the Republican camp. The two stories may fall into the respective camps based on the contributor's opinion that each is written with a bias toward respective Democrat/Republican viewpoints, or that each is written from a perspective of either one. Once the contributor selects a scale for each story, he then assigns a score (step 14) for each of the scales. Thus, in the example given, a contributor may score one story as "moderately Republican" and a second story as "extremely Democratic." (The term "score" herein may refer to a value along a scale or score line.)

The contributor then posts the two stories (step 16) whereby one story occupies a first position and a second story occupies a second position on a webpage. The two positions each reflect an area of a scale. That is, a first display position (e.g. left pane) may represent the left side of a scale (e.g. 1-50) and a second display position (e.g. right pane) may represent a right side of a scale (e.g. 51-100). The two display positions are clearly delineated. For example, in one embodiment, a first story occupies an upper half of a display, whereas a second story occupies a lower half of a display.

The stories are displayed on a webpage (step 18), where users may review the opposing stories (step 20) and review the score that is displayed for each of the stories (step 22). The user may then assign his/her own score. That is, the user may agree with the score associated with the story, or he/she may decide to score it differently. In either case, the user may select respective scores for respective stories and register his/her score. Any time a user scores a story, the entry is logged into a database, which tracks the user, score and timestamp.

In embodiments of the invention, the system records each score submitted by users and mathematically averages them so as to represent a discrete point along a continuum. For example, if three users each score a first story as 23, 35 and 40, respectively, the system will display an averaged score of around 32.6.

In embodiments of the invention, a plurality of users may sharply disagree with how a story is ranked and they may each score a story with a value that is on the other side of the midpoint. That is, for example, a story scored as "Republican" may, in fact, represent a "Democrat" perspective according to a plurality of users. In the event that sufficient users score the story as "Democratic," the average score may move from the right side (Republican side) to the left side (Democrat side). The system will thus, move the story to a display area corresponding to the new score.

That is, in embodiments of the invention, the input of a plurality of users may cause the score for a given story to shift in either direction across the scale's midpoint, and thus, cause the position the story occupies on the display page to correspondingly shift. In the example given above, whereby respective stories are scored as "moderately Republican" and "extremely Democratic," it may be that a plurality of users disagree that the first story is "moderately Republican." They may all be of the opinion that the story represents a "moderately Democratic" view. Thus, they will each score the first story as "moderately Democratic." Once a threshold number (e.g. a majority) of users score the first story as such, the position of the story will shift to the opposite side of the display (e.g. move to the Democrat side). For example, whereas, a story may have been positioned (or associated to a group) on the left or upper sides of a display, the position may dynamically shift to the opposite side (e.g. right or lower) of a display in response to user input (and be re-rendered to a new placement on the line and/or in a the same or different grouping).

With reference to FIG. 1, the system is programmed to query values for each scale associated with respective stories and determine whether or not the score shifted in either direction (step 20). If the score did not shift, then the position for each of the stories and/or groupings are maintained (step 22). However, if a score has shifted to the opposite direction, then the system moves that story to the corresponding side of the display (step 24). When the user submits their score, the front end will be refreshed (rendered) by the web server, every time the front end is rendered, it will display the stories based on their current scores, hence if the score shifted the story, the display will now reflect the new position(s).

Figure 2:
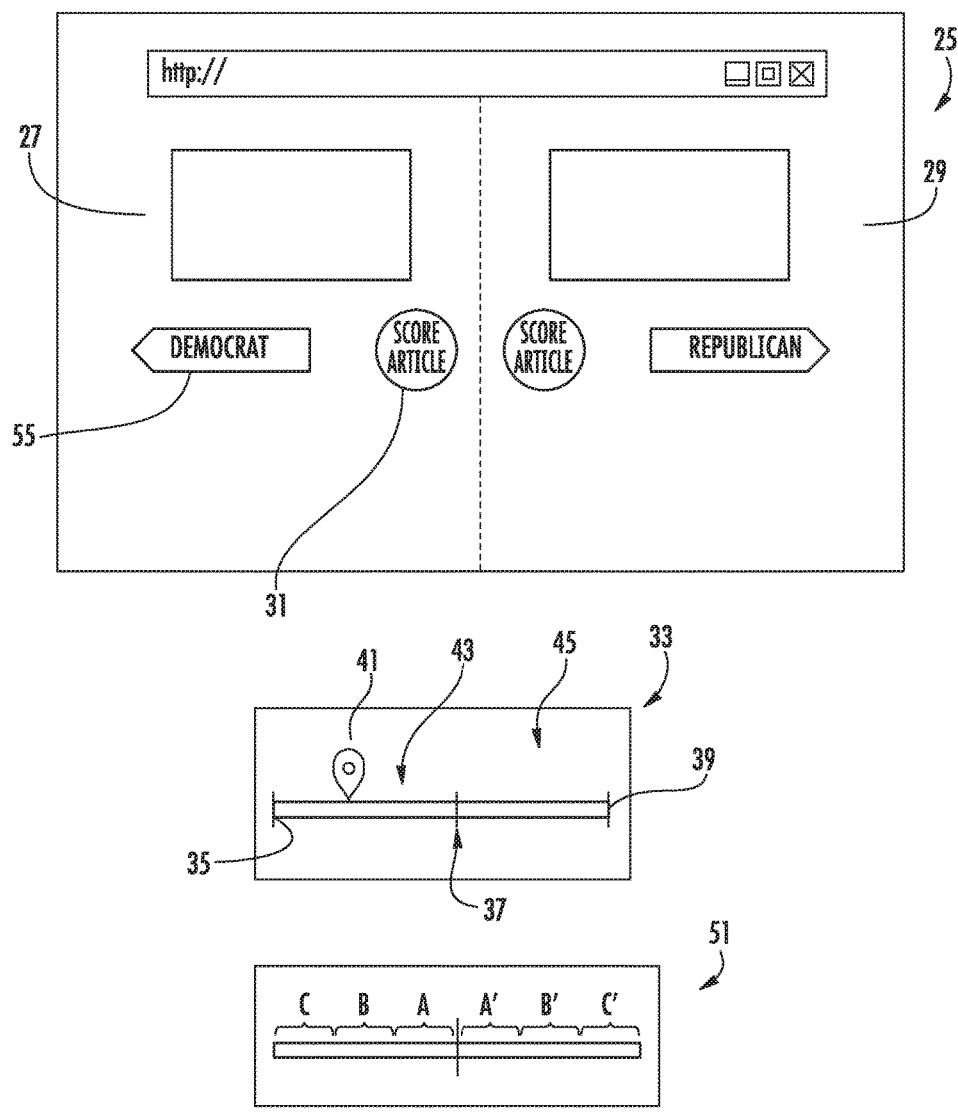
FIG. 2 is a schematic representation of dynamic webpage and scale interfaces according to exemplary embodiments of the invention.

FIG. 2 shows a dynamic webpage 25 according to an embodiment in the invention. In an exemplary embodiment, a contributor selects two opposing stories about a news topic. As an example, a contributor may select two stories he/she deems to present respective "pro-Democrat" and "pro-Republican" views. A first story (e.g. pro-Democrat) is posted at a first position 27 on webpage 25, whereas, a second story representing an opposing view (e.g. pro-Republican) is posted at a second position 29 on webpage 25. In an embodiment, a banner 55 or similar presentation indicates the two opposing views for respective stories.

Users who review the opposing stories are presented with an interface allowing them to score one or more of the stories. For example, in one embodiment, the webpage 25 provides a button 31 which may be clicked or otherwise selected/pointed by a user to display a scale associated with a particular story or article. The user may then score the article by selecting a value along the scale and submitting his/her score to the system.

In one embodiment of the invention, a scale associated with posted stories is a sliding scale having a beginning point 35, a midpoint 37 and an endpoint 39. A pointer 41 may be dragged across and placed at any point between beginning point 35 and endpoint 39. A score along the scale may reflect a value assigned by a contributor, user, or an average score calculated from a plurality of user-assigned values. Scores within certain ranges of the scale are associated with specific areas of a webpage. As such, stories having a certain range of scores will be displayed at one screen location, whereas, scores within other ranges will be displayed in a different display location (and associated to dynamic groupings as such). For example, in the embodiment shown, left side 43 (e.g. values between beginning point 35 and midpoint 37) of scale maps to left side 27 of webpage 25 and right side 45 of scale (e.g. values between 37 and 39) map to right side 29 of webpage 25. Thus, a story that is assigned a score on the left side 43 of scale 33 will be displayed on left side 27 of webpage 25, whereas, a story assigned a score within the right side 45 of scale 33 will be displayed on the right side 29 of webpage 25.

It will be understood that any of various scales having any of various value increments may be utilized in embodiments of the invention. For example, a scale 41 may be provided with three discrete values on each side of a midpoint. As shown, a scale may comprise three selectable increments (A, B, and C) representing three levels within a viewpoint (e.g. moderate, left, and far left); and three increments (A', B' and C') representing three levels within a second view point (e.g. moderate, right, and far right).

It will be understood by those of ordinary skill in the art that any number of stories may presented on a webpage as described—corresponding to any number of ranges within a scale. That is, although embodiments of the invention were described with respect to two stories respectively representing two opposing views, the invention is not limited to two stories. It will be recognized that three or more stories may be displayed on a webpage, each mapping to a certain range of values on a scale. Moreover, in embodiments of the invention, a contributor need not select two opposing stories, rather he/she may post a single story representing a single view and an associated scale.

In embodiments of the invention, the system allows users to add stories to groupings of stories according to selected values on a continuum. For example, referring to FIG. 3, (where the steps executed by contributors and users are shown in solid line, and the steps executed by the system are shown in dashed lines), a contributor may select two opposing stories 26, select a corresponding scale 28 and assign a score 30 to each of the scales. In addition, the contributor selects tags or keywords 32 common to the two stories. The contributor then posts the stories 34 to a dynamic webpage, whereby a first story in displayed in a position corresponding to a score applied by the contributor and the second story is displayed in a position corresponding a score applied by the contributor.

As shown, the system performs Internet searches (step 36) based on the keywords selected by the contributor in step 32 and it selects a plurality of stories that are relevant to the selected keywords ("related stories"). The system then displays the plurality of related stories as a newsfeed 38. In a preferred embodiment, the newsfeed is displayed proximate to the opposing stories selected by a contributor.

The system then assigns the scale (step 40) selected by the contributor (in step 28) to each story in the newsfeed. Initially, the scale associated with each story in the newsfeed is blank. That is, the stories are posted an association with a scale, however, no values are initially selected on the scale.

As shown, a user may review one or more articles in the newsfeed (42) that are displayed in the newsfeed. In an embodiment of the invention, the newsfeed is a series of thumbnails—any of which may be selected by a user. Once selected (e.g. by double clicking), the story becomes viewable to a user. Once the story is open, a user will be presented with the blank scale (the first time the story is opened by any user). The system determines whether or not a user has scored a story in the newsfeed (step 46). In the event that no score is registered for a story in the newsfeed, then the story will remain in the newsfeed (step 48).

In embodiments of the invention, in the event that a user assigns a score to a story found in the newsfeed, the system will dynamically shift the story and display it in an area of a webpage that corresponds to the assigned score (step 48). That is, if the story was given a score that corresponds to a left side of a scale—it will be shifted to the side of the page that represents the view corresponding to the left side of a scale. Once a story is shifted from the newsfeed into the contributor side of the page, the system continues to monitor the scales associated with the story to determine if the scale shifted to the opposite side of the scale (step 49). If the scale does not shift—the story remains in position on the page (step 51). However, if a sufficient number of users score the story with values on the opposing side of the scale—then the system will dynamically shift the story and display it on the side of the page corresponding to the opposite side of the scale (step 53).

Figure 3:
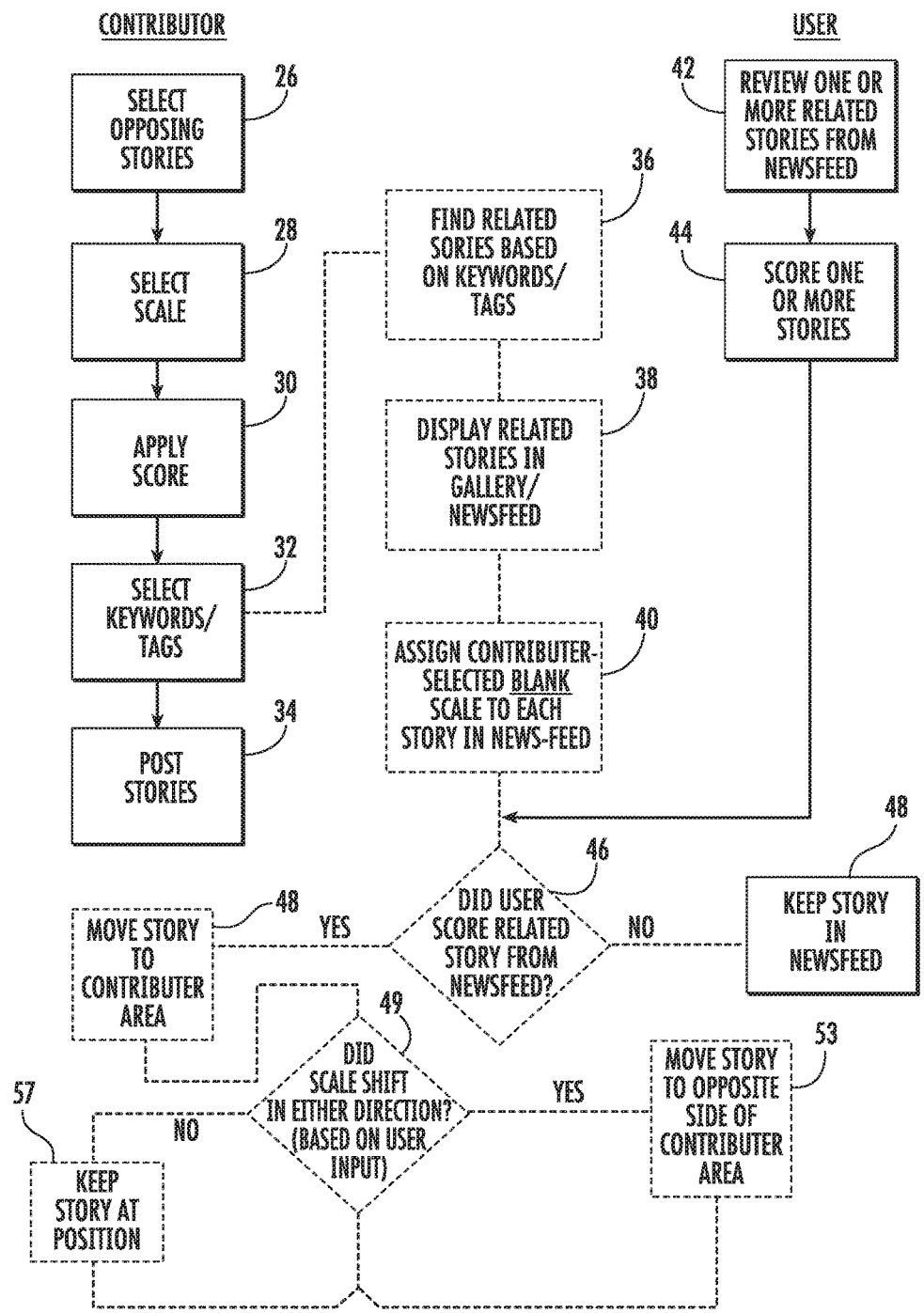
FIG. 3 is a flow chart showing a system architecture for a dynamic webpage for creating groupings of data according to an exemplary embodiment of the invention.
Figure 4:
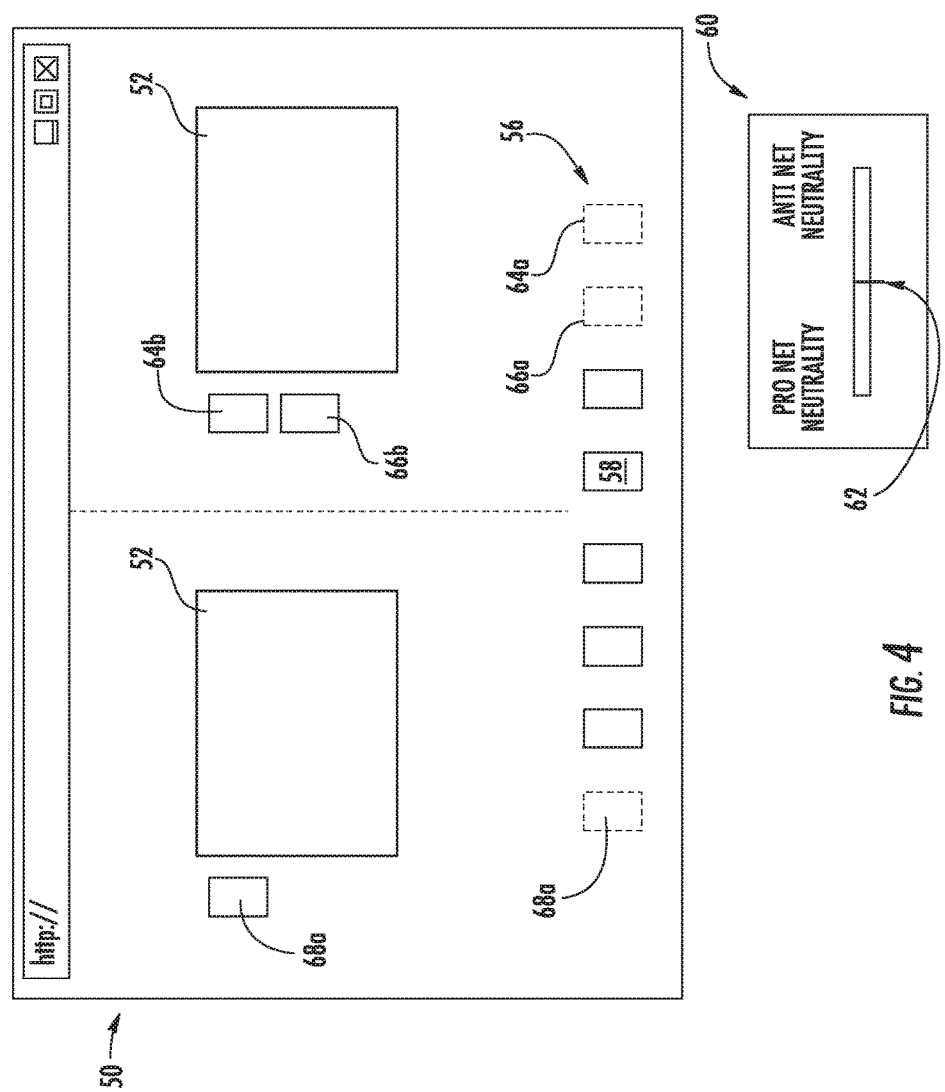
FIG. 4 is a schematic representation of a dynamic webpage for creating groupings according to exemplary embodiments of the invention.

FIG. 4 shows a dynamic webpage 50 according to an embodiment in the invention. In an exemplary embodiment, a contributor selects two opposing stories or articles (e.g. relating to a news topic). As an example, a contributor may select two stories he/she deems to present opposing views on "net neutrality." A first story in favor of net neutrality is posted at a first position 52 on webpage 50, whereas, a second story opposing net neutrality is posted at a second position 54 on the webpage 50. The contributor also selects tags and/or keywords that are connected to the topic of net neutrality (e.g. "net neutrality," "open internet," "internet censorship," and "net equality"). The system then searches for other news stories that are related to the selected keywords, and it displays the related stories on the webpage 50 showing the two contrasting stories. For example, in FIG. 3 a newsfeed 56 is shown comprised of a series of thumbnails 58 located in proximity to the opposing stories (e.g. below the opposing stories as shown). Each thumbnail 58 represents a related story.

In embodiments of the invention, the stories in the newsfeed 56 are displayed in a random order without any grouping according to a viewpoint. In embodiments of the invention, the system allows users to create groupings of the stories in the newsfeed by scoring them as described. That is, when a user clicks on a thumbnail 58 in the newsfeed and accesses the full story, a scale associated with the story will be accessible by the user. For example, FIG. 3 shows a scale 60 having a midpoint 62. Values to the left of midpoint 62 represent the "pro net neutrality" view, whereas, values to the right of midpoint represent the "anti net neutrality" viewpoint.

As stated, a blank scale 60 is associated with each story in the newsfeed 56. Once a score is assigned a score along a scale, however, the system moves the story and displays it on the side of the webpage 50 corresponding to position of the score.

For example, thumbnail 64*a* is a story in the newsfeed that was opened and reviewed by a user. The user determined that the story aligns with an anti net neutrality viewpoint. The user, thus, scored the story with a value to the right of midpoint 62 on scale 60. In response, the story was moved and displayed on the side of the page (e.g. right) that correspondence to or maps to the right side of the scale 60. As shown, thumbnail 64*a*, which was initially displayed in the newsfeed 56, was moved by the system to be displayed as a thumbnail 64*b* on the side of webpage 50 corresponding to the anti net neutrality side of the page. Similarly, thumbnail 66*a* which was initially displayed in the newsfeed, was moved by the system to be displayed as a thumbnail 66*b* on the side of webpage 50 corresponding to the anti net neutrality side of the page based on a user score (or an average score from multiple users). Thumbnail 68*a* also began as representing a story within the newsfeed 56. However, one or more users scored the story with a value to the left of midpoint 62. As such, the system moved the story and displayed it as a thumbnail 68*b* on the side of the page 50 corresponding to the left side of the scale (e.g. "left side" or "pro net neutrality").

It will be understood by those of ordinary skill in the art that in embodiments of the invention, the system provides a platform for users to create groupings of content from data sources outside of the confines of "the system." In embodiments of the invention, users may score stories or other content hosted on third party websites.

In embodiments of the invention, content such as news articles and the like residing on various webpages or hosted on various servers accessible through the Internet may have an associated scale for receiving a score input from a reader. For example, a scale may be associated with a story through a web add-on/extension/Facebook® application or such similar device that will allow viewers of third party content on the Internet to access an associated scale and score an article.

The specific scale can be generated by a user or generated by an algorithm based on article content and/or keywords and/or embedded tags. In one embodiment, the system is defaulted to yield a scale that is dynamically driven from the content of the article.

In embodiments of the invention, scores associated with stories on third party websites may be used to add additional articles to a contributor-specific dynamic webpage (e.g. as described with respect to FIG. 2 and/or FIG. 4). In other embodiments, scores associated with stories on third party websites may be used to render a master dynamic webpage.

Figure 5:
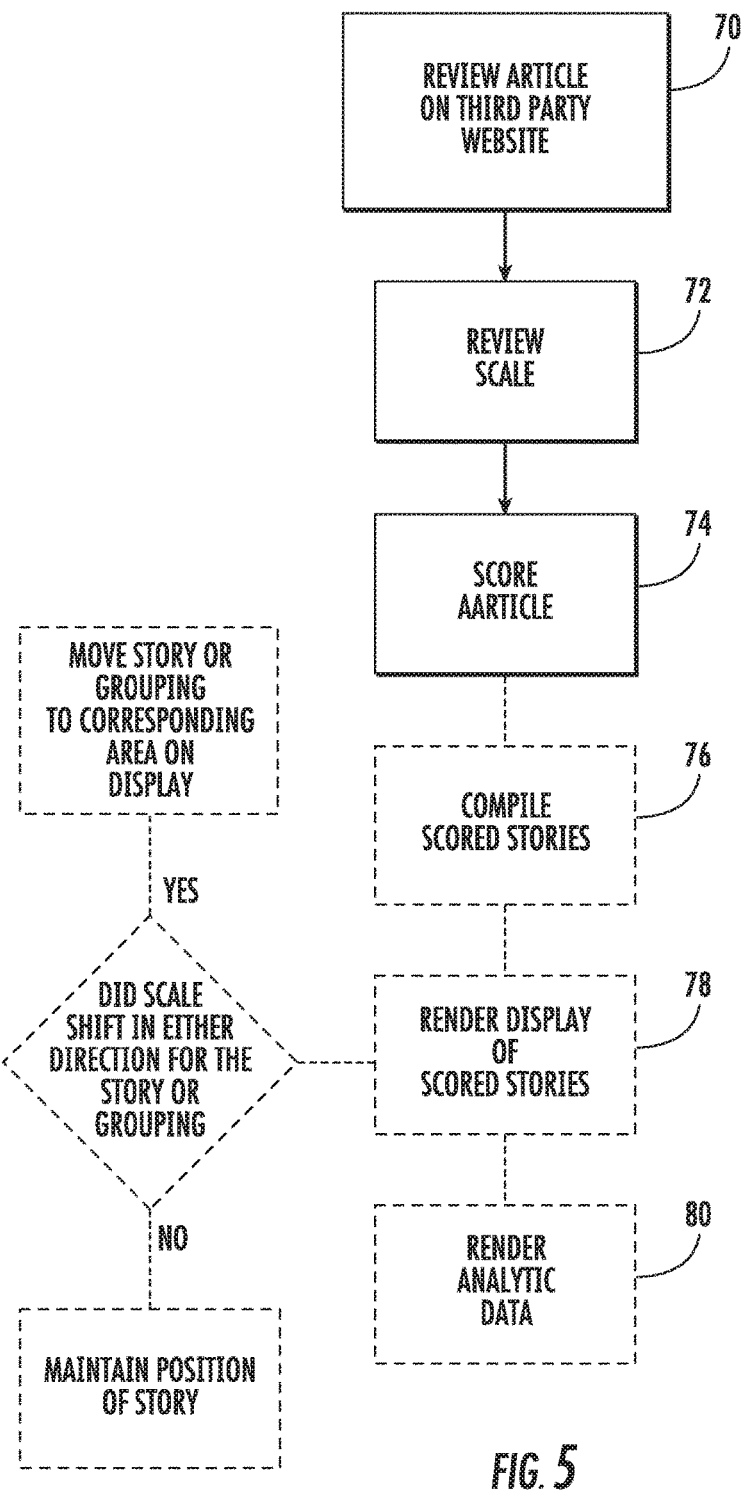
FIG. 5 is a flow chart showing a system architecture for rendering a master webpage for grouping data according to an exemplary embodiment of the invention.

FIG. 5 shows a flow chart illustrating the steps of rendering a master dynamic webpage according to an exemplary embodiment of the invention. The steps executed by contributors and users are shown in solid line, whereas, the steps executed by the system are shown in dashed lines. As shown, a user reviews an article on a third party website 70. The user then selects a scale 72 and reviews the same. In one embodiment, a scale is automatically populated on the website through a widget or similar web add-on. In another embodiment, the third party website supplies a link or similar button allowing a user to access a scale. Importantly, the scales provided on third party websites link to the system. In embodiments of the invention, a link or button will send a call to the service level which will then add a record to the database indicating the user, location, source website, article/content being referenced, key words/tags and ranking given. Based on the information provided the article/content will be associated to stories and used for analytical analysis.

In one embodiment of the invention, a scale accessed on a third party website is blank. A user may, as such, score the story as desired 74. The system compiles stories that have been scored on various third party websites 76 and renders a master dynamic webpage 78.

The master dynamic webpage may be rendered to show a grouping of stories in any of various modes. For example, in one embodiment of the invention, the system compiles all stories from various sources that have a certain scale assigned. For example, the system may compile all stories that were assigned a "Democrat/Republican" scale. The system then displays the stories on the master webpage according to how each story was scored. In the example cited, stories corresponding to scores for "moderately Democtratic" will be displayed in one display area; stories corresponding to scores for "extremely Democtratic" will be displayed in a second display area; stories corresponding to scores for "moderately Republican" will be displayed in third display area etc.

In embodiments of the invention, a mechanism for placing articles and associating them to contrasting grouping can be done using a simple mean algorithm. However a myriad amount of algorithms and artificial intelligence approaches can be used to determine how to group articles to from objective and clear distinctions between positions. In order to maintain impartiality the design allows for an "Algorithm driver" which will allow end users to utilize their own algorithms including lexicon driven groupings. Additional grouping can be historically based or ones that group all stories that share one or more common score lines (this will show how numerous stories and conversations are a manifestation of general approaches/values.

It will be understood by those of ordinary skill in the art that this novel approach to information/media/concepts sharing can be applied to any information/media/concepts. For example, in an embodiment of the invention, the inventive system could be used to create a political/social polling platform, database, admin-user interface and social networking tie in. This platform is to allow for dynamic prioritization for user defined ranking of content and questions. In a preferred embodiment, as time evolves, users can define questions/content as relating to each other and relating to a specific grouping of opinions. Once a grouping of opinions is defined, then that specific grouping can be contrasted against another grouping. As a specific grouping or set of groupings becomes antiquated, it can be retained as a history for future groupings. This nature of the algorithm is part of the organic outgrowth of the social media aspect. Once a grouping is defined and trending small iterations of that grouping that strike a divisive cord become priority polls which are rooted in a more common root or base.

Similar to a polling solution, the inventive system can be applied to any number of other applications such as news content, music, videos, advertisements and any other area where content/concepts can be ranked and/or contrasted and/or displayed and/or retained and/or outputted for current or subsequent groupings or displays. While the above is not a specific algorithm and has applications that do not require any algorithm this approach can leverage any number of existing algorithms as a means or filtering of content and/or retained information. The concept also invites basic means of filtering/retaining information for storing and/or dynamic dissemination with the use of run time and/or predefined and/or incorporate.

In one exemplary embodiment of the invention, a website is provided where users may view the most popular news stories of the moment. For each news story there is the ability to scroll to the right or left to see popular stories that have been selected by other users as representing right, left, extreme right or extreme left views of the give story. A user can also modify the page settings to only display one article representing the most selected balanced approach; alternatively a user can select to have the display show, two or more articles that would represent trending contrasts of one story. A user can highlight an article and contrast it against another article or a predefined spectrum, (such as politically Central, Right or Left.). A user can then share their ranking on other social media sites. There can also be a tie in from other social media sites that would allow for an article to be ranked directly from that site. There is an option for Superusers to promote, rank and/or define the spectrum (such as Right, center, left). A different user can then have the option on the main news page to have the Superusers ranking incorporated into their page.

The computer system of the present invention and/or any computer system or user device with which it communicates may include one or more processors and non-transitory computer-readable memory with one or more software modules stored thereon and running or configured to run on the one or more processors and perform the processes described herein. Each computer system or electronic user device may also include one or more communication portals, which may handle, process, support, and/or perform wired and/or wireless communications (e.g., transmitting and/or receiving data). Communications systems can comprise hardware (e.g., hardware for wired and/or wireless connections) and/or software. In embodiments, communications systems can include one or more communications chipsets, such as a GSM chipset, CDMA chipset, LTE chipset, Wi-Fi chipset, Bluetooth chipset, to name a few, and/or combinations thereof. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few. Computer systems may communicate with other computer systems or devices directly and/or indirectly, e.g., through a data network 5, such as the Internet, a telephone network, a mobile broadband network (such as a cellular data network), a mesh network, Wi-Fi, WAP, LAN, and/or WAN, to name a few.

Figure 6:
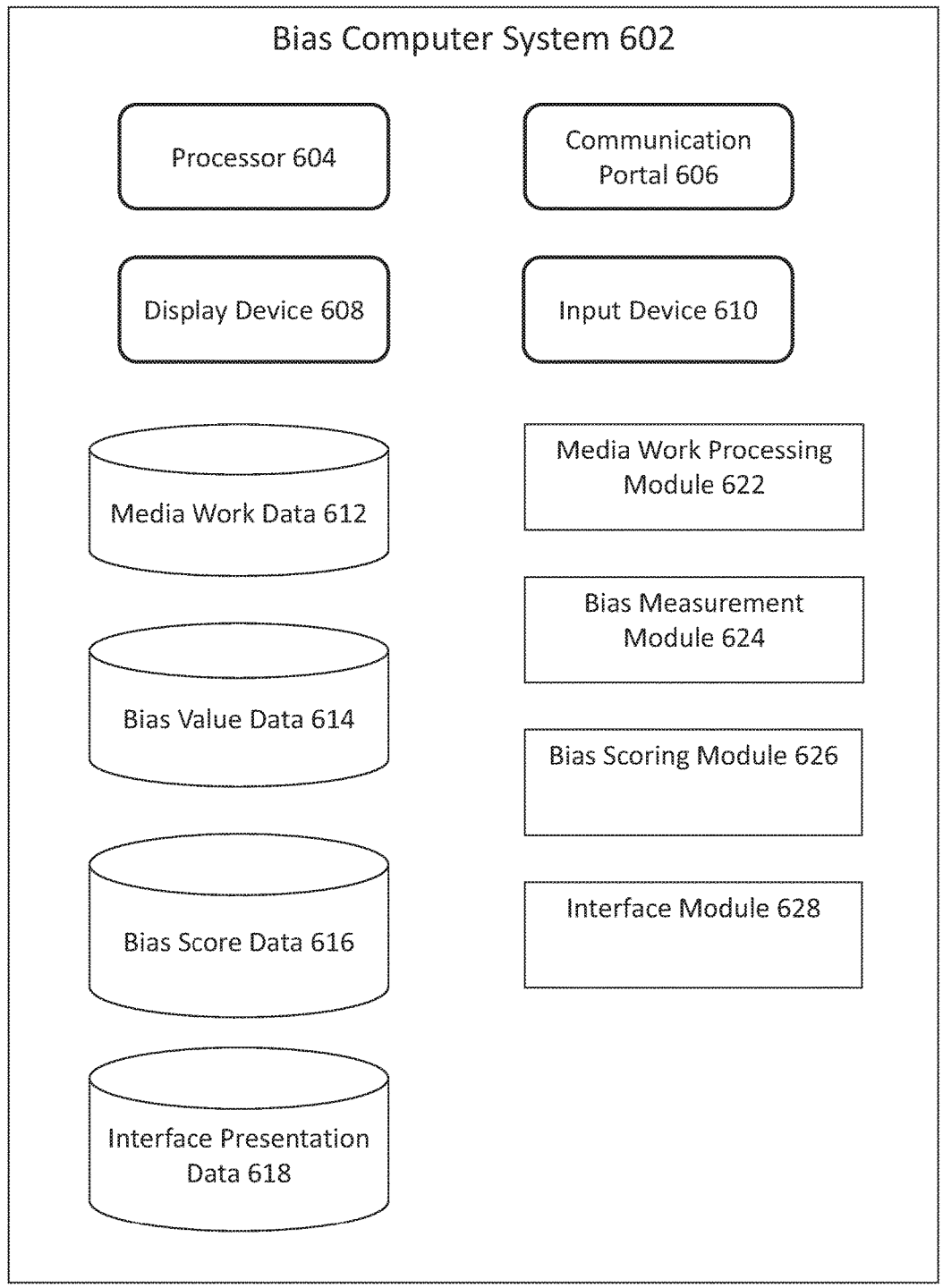
FIG. 6 is a schematic diagram of a bias computer system according to an exemplary embodiment of the invention.

FIG. 6 is a schematic diagram of a bias computer system 602 in accordance with exemplary embodiments of the present invention. The bias computer system 602 may receive and/or retrieve media works, such as news articles, receive user-provided bias measurements, compute aggregated bias scores, and/or generate dynamic interfaces for presentation of at least the media works, as described herein.

The bias computer system 602 may comprise one or more processors 604, communication portals 606, display devices 608, and/or input devices 610 (e.g., keyboards, mice, touchscreens, microphones, cameras, to name a few). In embodiments, the bias computer system 602 may comprise a distributed computing system and/or one or more servers. In embodiments, the system 602 may not include display devices or input devices.

The bias computer system 602 can further include non-transitory computer-readable memory, which may comprise one or more databases, operatively connected to the one or more processors 602, and which may store media work data 612, bias value data 614, bias score data 616, and/or interface presentation data 618, to name a few. Such data may be stored in one or more databases, which may be stored in local memory and/or external or otherwise remotely located memory devices operatively connected to the one or more processors 604. The bias computer system 602 can also include one or more software modules running or configured to run on the one or more processors 602. The modules can perform any of the operations described herein and can include a media work processing module 622, a bias measurement module 624, a bias scoring module 626, and/or an interface module 628, to name a few. In embodiments, processes and roles described with respect to one module may be performed by one or more other modules. In embodiments, a particular module may perform operations described with respect to one or more other modules.

Media work data 612 may comprise one or more electronic addresses associated with media works (e.g., URL addresses), text data, author data, source data (e.g., publisher information), publishing dates and/or times, to name a few. In embodiments, media works that are uploaded to and/or retrieved by the bias computer system 602 (e.g., from a URL address) may be stored and may be retrievable as formatted or unformatted text.

Bias value data 614 may comprise a plurality of bias values for each respective media work, which bias values may be provided by users (e.g., viewing or non-contributing users) as described herein.

Bias score data 616 may comprise aggregated and/or computed bias scores for each media work. Bias score data 616 may be updated as bias scores are computed or recomputed, such as in response to receipt by the bias computer system 602 of additional bias values or modified bias values for a media work.

Interface presentation data 618 may comprise media work ranking data or other layout data to identify positional information for location of the media work in a generated interface. Interface presentation data 618 can further include display presentation data, such as sizes and/or colors (e.g., CSS data).

A media work processing module 622 may ingest media works, such as via uploading (e.g., uploaded files) and/or downloading (e.g., retrieving data from a URL or remote electronic source). The media work processing module 622 may index text (e.g., store non-duplicate and non-trivial words extracted from the text), extract keywords, and/or store media works.

A bias measurement module 624 may receive user-provided bias measurements or ratings. In embodiments, the bias measurement module 624 may receive such bias values via a bias measurement graphical user interface (GUI), which can comprise a scale (e.g., a slider bar) that a user can set to indicate a perceived bias level.

A bias scoring module 626 may aggregate bias values for each respective media work. In embodiments, a bias scoring module 626 may compute a bias score such as by averaging the bias values. The bias score may compute weighted averages, wherein one or more bias values may be weighted based upon the user who provided the bias value, the viewing time of the user for the media work (e.g., to reduce risk of uninformed ratings such as where a user did not read the work), and/or a user's feedback or rating history, which may be measured against variation from other users (e.g., via standard deviation or other statistical computations).

An interface module 628 may dynamically generate one or more presentations, such as presentations of media works as described herein. The interface module 628 may control layout, which may change dynamically over time in response to changing rankings of the media works. The generated layout may provide side-by-side or otherwise linked presentations of media works describing the same underlying content but from different perspectives or bias levels, as indicated by the respective computed bias scores.

Having described this invention with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A method of dynamically forming a display of data comprising the steps of:

performing a first rendering of a webpage having a first display area at a first position of the webpage and a second display area at a second position of the webpage, and a news feed of stories at a third position of the webpage, the news feed comprising a listing of a plurality of articles;

assigning a scale to each of the plurality of articles in the newsfeed, whereby each scale assigned to each of the plurality of articles is configured to receive a score;

receiving a first score on a first scale assigned to a first article in the newsfeed and receiving a second score on a second scale assigned to a second article in the newsfeed, wherein the first score is a value within a first range on the first scale and the second score is a value within a second range on the second scale, whereby the first range is associated with the first display area on the webpage and the second range is associated with a second display area on the webpage;

performing a second rendering of the webpage, whereby the first article in the newsfeed having received a score in the first range is dynamically moved to the first display area at the first position on the webpage and the second article in the news feed having received a score in the second range is dynamically moved to the second display area at the second position on the webpage.

2. The method of claim 1, further comprising the step of receiving a first plurality of scores for the first scale and a second plurality of scores for the second scale.

3. The method of claim 2, further comprising the step of averaging the first plurality of scores to yield a first average score and averaging the second plurality of scores to yield a second average score.

* * * * *